United States Patent
Aziz et al.

[11] Patent Number: 5,978,086
[45] Date of Patent: Nov. 2, 1999

[54] METHOD AND APPARATUS FOR CORRECTING SHIFTS BETWEEN A REFERENCE FOCAL POINT AND A REFERENCE SURFACE AS A RESULT OF THERMAL EFFECTS IN AN INTERFEROMETRIC OPTICAL OBJECTIVE

[75] Inventors: David J. Aziz; Robert E. Knowlden, both of Tucson, Ariz.

[73] Assignee: Wyko Corporation, Tucson, Ariz.

[21] Appl. No.: 08/814,351

[22] Filed: Mar. 11, 1997

[51] Int. Cl.⁶ .................................................. G01B 9/02
[52] U.S. Cl. ............................................................ 356/357
[58] Field of Search ............................... 356/357, 358; 359/392, 382, 383; 352/140

[56] References Cited

U.S. PATENT DOCUMENTS 5,067,808  11/1991  Alscher ................................. 352/140
5,315,110  5/1994  Smith ...................................... 356/358

*Primary Examiner*—Samuel A. Turner
*Attorney, Agent, or Firm*—Antonio R. Durando

[57] ABSTRACT

Structural components are added to an interferometric objective to offset the effects of temperature variations. The components are mounted between the sleeve housing the optics of the objective and the collar housing the optics of the interferometer. Each component is coupled sequentially, such that the thermal response of the assembly is substantially the linear combination of the response of each component and is designed to cause a shift in the opposite direction to the shift produced by a temperature change in the unmodified device. The thermal characteristics and dimensions of the components are chosen empirically to provide a minimum shift between the reference mirror and focal point in the interferometric objective as a function of temperature.

22 Claims, 12 Drawing Sheets

METHOD AND APPARATUS FOR CORRECTING SHIFTS BETWEEN A REFERENCE FOCAL POINT AND A REFERENCE SURFACE AS A RESULT OF THERMAL EFFECTS IN AN INTERFEROMETRIC OPTICAL OBJECTIVE

BACKGROUND OF THE INVENTION

1. Field of the Invention

This invention is related in general to the field of interferometry and, in particular, to a method and apparatus for minimizing shifts between the focal point and the reference mirror caused by thermal effects in the optical microscope objective of an interferometer.

2. Description of the Related Art

Many interferometric devices utilize microscope objectives for focusing beams of light on a sample surface and a reference surface to produce interference fringes representative of the optical path difference (OPD) between the two. As illustrated in simple schematic form in FIG. 1, typical interferometric apparatus 10 consists of a light source 12 directing a beam L of light through an illuminator 14 toward a beam splitter 16, which reflects the light in the direction of a test surface S. The light reflected by the beam splitter 16 passes through a microscope objective 22 focused on the test surface S and incorporating an interferometer (not seen in the figure). The interferometer, such as a Mirau device, for example, comprises a beam splitter and a reference mirror, such that the light beam directed to the sample surface S is split and also directed to the reference mirror. As is well understood by those skilled in the art, the light beams reflected from the reference mirror and the test surface S (the reference and test beams, respectively) are combined to produce interference fringes as a result of the optical path difference between the reference mirror and the test surface S. The light is typically passed back through the interferometric microscope objective 22 and through the beam splitter 16 toward an imaging array 24 positioned in a camera 26 in coaxial alignment with the objective 22. The imaging array 24 typically consists of individual charge-coupled-device (CCD) cells or other sensing apparatus adapted to record a two-dimensional array of signals corresponding to interference effects produced by the interferometer as a result of light reflected at individual x-y coordinates or pixels in the surface S and received at corresponding individual cells in the array. Appropriate electronic hardware (not shown) is also provided to process the signals generated by each cell and transmit them to a computer for further processing. Thus, an interference-fringe map is generated by detecting the intensity of the light signal received in each cell of the array 24. Additional information about the test surface S can be gained by varying the OPD between the reference and test surfaces with a scanning device (not shown) translating either the reference surface or the test surface.

The present invention is directed at an unsolved problem caused by thermal effects in the typical interferometric objective 22 of the interferometer. As illustrated schematically in FIG. 2, a conventional interferometric objective 22 consists of microscope-objective optics 30 adapted to focus the light beam L at a test focal point P on the test surface S of the object being measured. For the purpose of this disclosure, the light beam L is assumed to come from an object location an infinite distance behind the microscope objective, thereby locating the test focal point P defined here at the focal point of the objective. As one skilled in the art would readily understand, though, the disclosure applies equally to the case where the source of beam L is located a finite distance behind the objective and the test focal point P does not coincide with the focal point of the objective. Thus, while the "infinite conjugates" imaging condition, as understood in the art, is used here to simplify the description of the invention, the description can be generalized with no loss of accuracy to the "finite conjugates" imaging condition.

The optics in the objective 30 are rigidly housed in a coaxial support sleeve 32 substantially along the entire length of the objective. A focusing sleeve 34 is mounted on the support sleeve 32 so that it can move along the optical axis X of the assembly for focusing the light beam L at the test focal point P. To produce the fine adjustments required for interferometric applications, the focusing sleeve 34 is typically coupled to the support sleeve 32 by means of a threaded engagement (seen in FIG. 12) along the interior of the sleeve 34, such as on the inside surface of the end collar 36.

As also shown in the enlarged partial view contained in FIG. 2, the focussing sleeve 34 includes a beam splitter 38 and a reference flat 40 with a reference mirror 42 attached to the reference surface 44. By rotating the focusing sleeve 34 with respect to the support sleeve 32, their relative axial position is shifted as needed to focus the light beam L on the reference surface 44. Obviously, the threaded engagement between the two structures is provided with the pitch necessary to produce the focusing adjustments required by the application. By design, once the beam L is focused on the object to be measured, the light reflected from the reference mirror 42 and from the test surface S is combined at the surface 46 of the beam splitter 38 and reflected back through the objective 30 for the necessary interferometric measurements. Therefore, it is critical for good interferometric measurements that the distance between the surface 46 on the beam splitter and the reference mirror 42 remain the same as the distance between the surface 46 and the test focal point P (that is, the reference focal point P' must remain on the mirror 42). For the purposes of this disclosure, the distance between the splitter's surface 46 and the reference mirror 42 is defined as the "reference length" and the distance between the surface 46 and the test focal point P is defined as the "test length." Thus, the reference length is selected by design such that the position of the reference mirror 42 is conjugate to the location of the test focal point P after the focusing of the objective on the test sample.

In practice, thermal effects cause component shifts that result in material changes in the focal length of the objective. When that happens, the test length changes and a mismatch occurs between the focal position of the test surface and the position of the reference mirror. As shown in FIG. 3, the nominal design configuration when the interferometric objective 22 is focused on the test surface S is illustrated by condition B, which is optimal, while mismatched configurations caused by thermal effects are shown as conditions A and C. Specifically, condition A is caused by a temperature change that results in an increase of the focal length of the objective, while condition C is produced by a temperature change that results in a decrease of the focal length. Under condition A, assuming, for purposes of illustration, that the distance between the splitter's surface 46 and the reference surface 44 (the reference length) remains unaffected by the change in ambient temperature, when the test beam is focused on the test surface S, the reference focal point P' is shifted beyond the reference mirror 42 and the image reflected by the mirror is out of focus. Similarly, under condition C the reference focal point P'is shifted ahead of the mirror 42 with the same result. Obviously, the interplay between the coefficients of thermal expansion of the various components in the objective 22 determines exactly what happens as a result of any departure from the design temperature for the device. Moreover, the reference length does not in fact remain constant through temperature variations, but also contributes to the mismatch illustrated above. As discussed above with respect to the test focal point P, the "infinite conjugates" imaging condition is used for simplicity of disclosure, but the description can be generalized with no loss of accuracy to the "finite conjugates" imaging condition with respect to the reference focal point P' as well.

Thus, the temperature dependence of the characteristics of conventional interferometric objectives affects the performance of the instruments under varied temperature conditions. Therefore, it would be very desirable to provide a solution to this problem.

BRIEF SUMMARY OF THE INVENTION

One primary object of this invention is an interferometric objective that has performance characteristics substantially independent of ambient temperature variations.

Specifically, an important goal of the invention is an objective wherein the distance between the reflective surface of the beam splitter in the interferometer and the reference mirror remains substantially the same as the distance between that surface and the focal point of the objective during ambient-temperature variations.

Another object of the invention is a method and apparatus that can be implemented with conventional interferometric objectives.

Still another goal is a method and apparatus that are suitable for incorporation within existing instruments.

A final object is a procedure that can be implemented easily and economically according to the above stated criteria.

Therefore, according to these and other objects, the present invention consists of the addition of structural components in an interferometric objective to offset the effects of temperature variations. The components are mounted between the sleeve housing the optics of the objective and the collar housing the optics of the interferometer. Each component is coupled sequentially, such that the thermal response of the assembly is substantially the linear combination of the response of each component and is designed to cause a shift in the opposite direction to the shift produced by a temperature change in the unmodified device. The thermal characteristics and dimensions of the components are chosen empirically to provide a minimum separation between the reference mirror and focal point in the interferometric objective as a function of temperature.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The present invention is based on the discovery that the shift in position of the reference focal point with respect to the reference mirror in an interferometric objective as a function of temperature variations is roughly linear within the temperature range of interest. Accordingly, since the thermal expansion of most materials within a relatively narrow temperature range is also substantially linear, the invention consists of adding structural components to the objective with the appropriate thermal characteristics required to offset the objective's thermal response and empirically produce an assembly with an effective coefficient of thermal expansion substantially equal to zero within the temperature range of interest.

Figure 4:
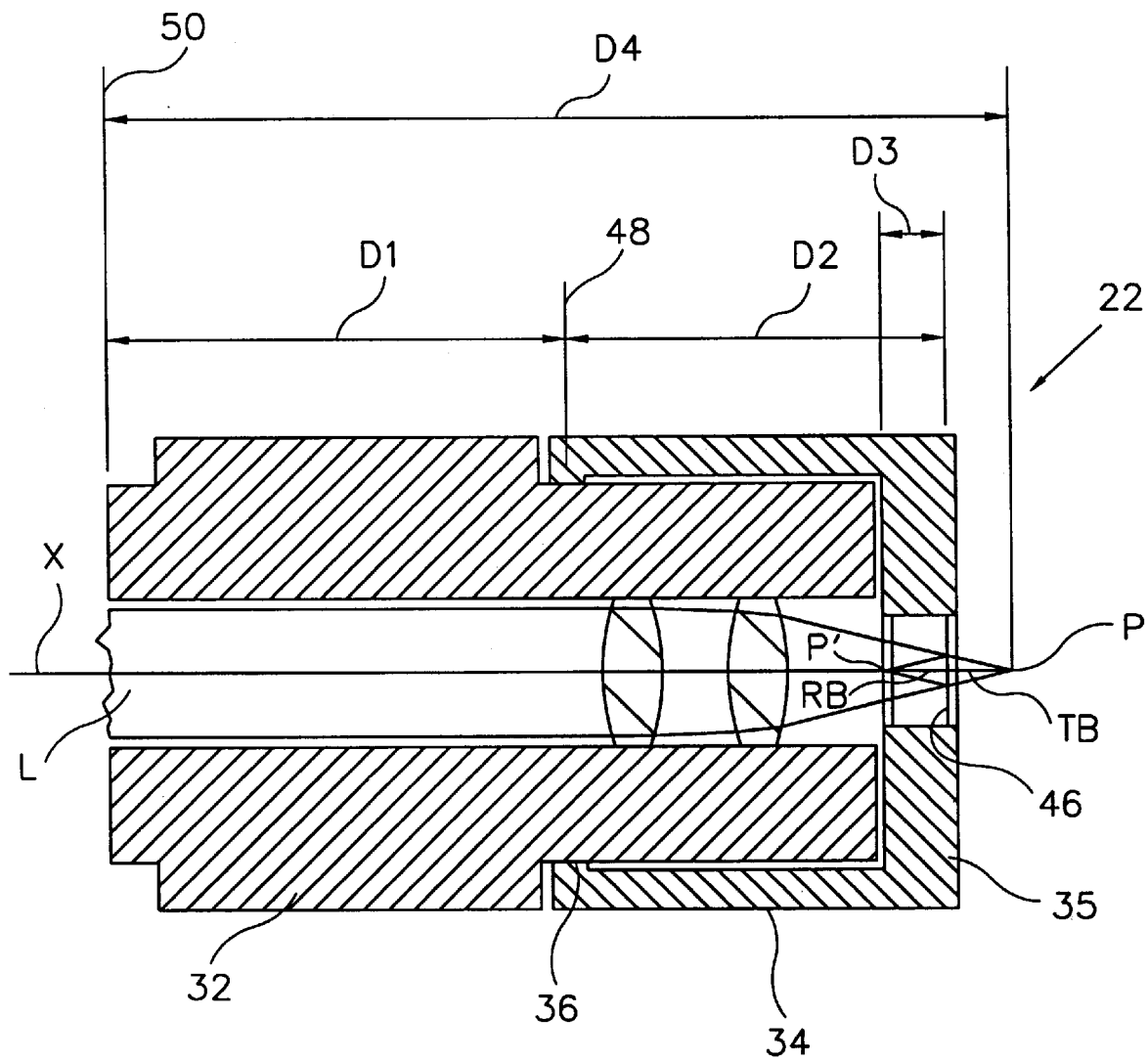
FIG. 4 illustrates the reference length and the test length in the microscope objective of FIG. 2 under nominal temperature conditions.

Referring to the drawings, wherein like parts are designated throughout with like numerals and symbols, FIG. 4 illustrates the optimal condition for operation of a conventional interferometric objective 22. The distances traveled by the reference beam RB and the test beam TB are defined in terms of structural segments in the objective 22. Note that a longitudinal position 48 is chosen to represent an average circumferential line of rigid connection within the attachment collar 36 coupling the support and focusing sleeves 32,34. In fact, the two sleeves are coupled through a surface (the threaded interior surface of the attachment collar 36 mating with the threaded exterior surface of the support sleeve 32), but the approximation is necessary to provide a longitudinal position corresponding to an effective point of attachment between the two sleeves. Thus, after entering the objective 22, the reference beam RB (at that point coextensive with the beam L) travels a distance D1 from the entry point 50 to the point of attachment 48, then a distance D2 to the splitter's surface 46, and finally a distance D3 to the reference focal point P'. Similarly, the test beam TB travels a distance D4 from the entry point 50 to the focal point P. The goal of the invention is to manipulate the thermal characteristics of the objective's components so that the paths to the reference mirror and to the test focal point (and therefore also to the reference focal point) retain substantially equal lengths in spite of temperature fluctuations. Expressed mathematically, it is desired that $$D1(T)+D2(T)+D3(T)=D4(T), \qquad (1)$$

where T is the temperature of the objective.

For various specific objectives, we discovered that the difference between the two paths as a function of temperature is substantially linear; that is, $$\Delta D(T)=D1(T)+D2(T)+D3(T)-D4(T)=a+bT, \qquad (2)$$

where a and b are the intercept and slope of a straight line equation. Note that $a=-bT_n$, $T_n$ being the nominal temperature of the instrument at which $\Delta D(T_n)=0$ by design. Therefore, the goal is to modify the effective coefficient of expansion of the objective so that $$\Delta D(T)=a+bT\approx 0 \qquad (3)$$

for all T in the range of interest. This condition is achieved, of course, when $b\approx 0$.

Figure 1:
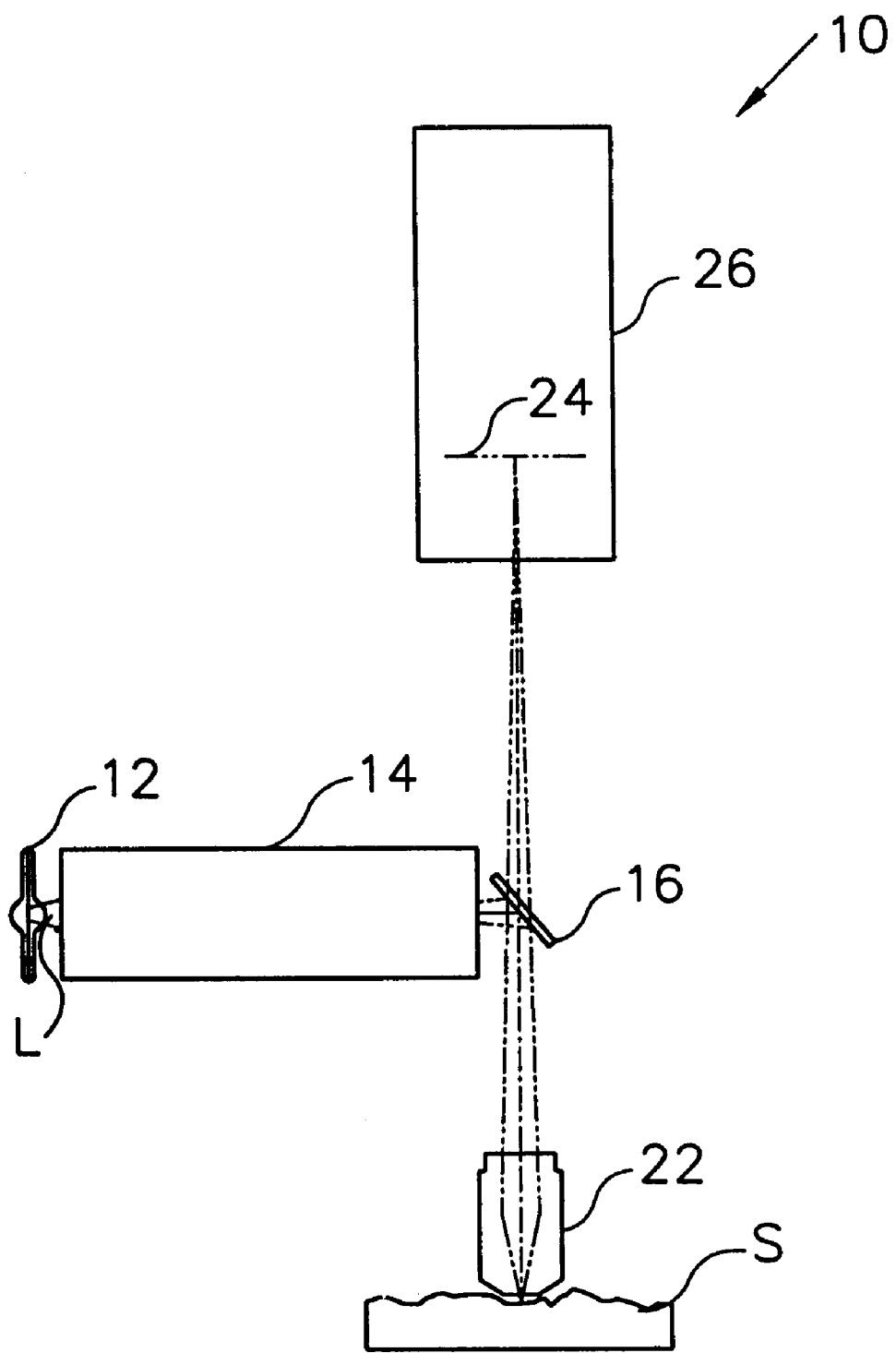
FIG. 1 is a simplified schematic representation of prior-art apparatus used in phase shifting and vertical scanning interferometry.
Figure 2:
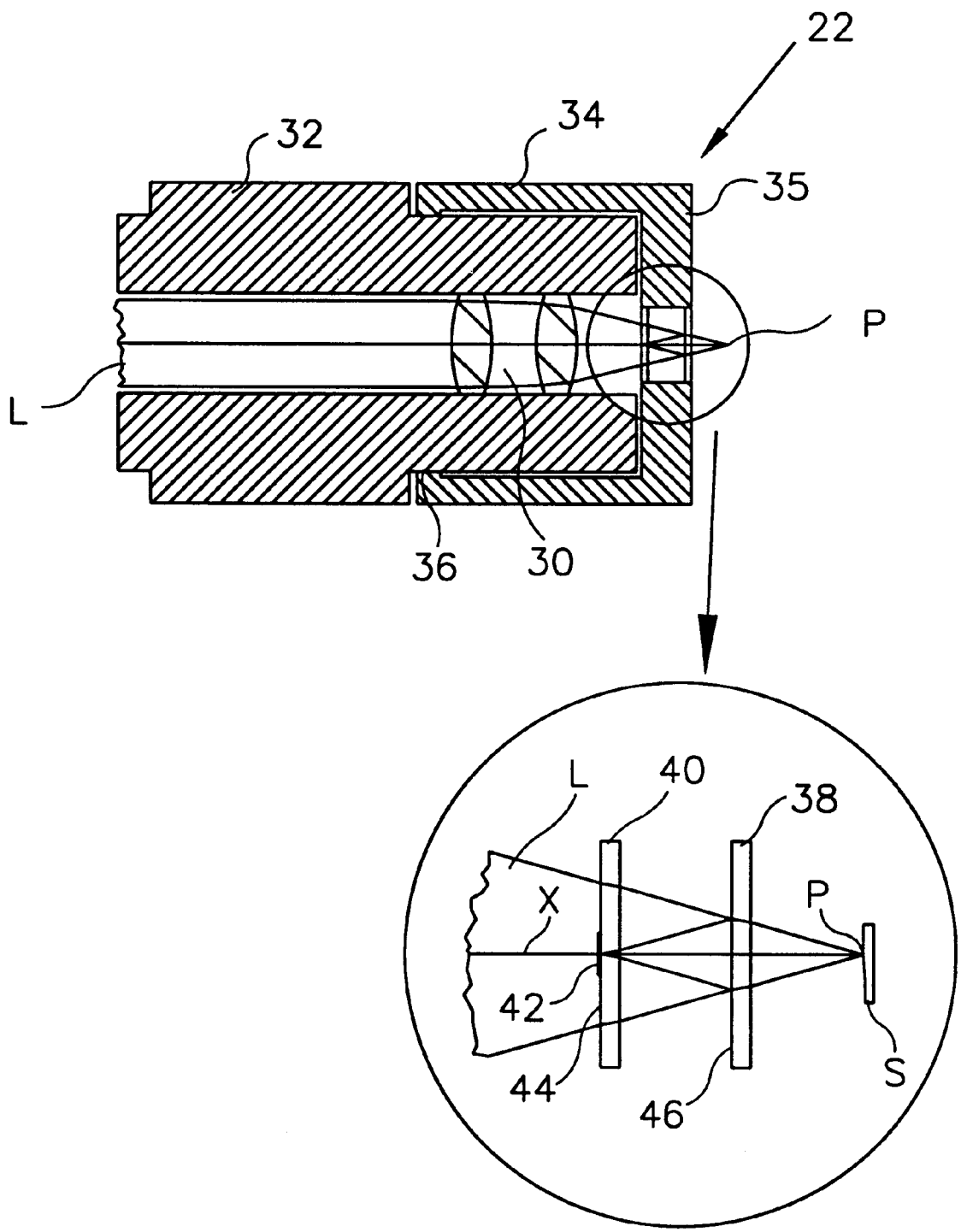
FIG. 2 is a schematic representation of a conventional microscope objective incorporating interferometric optics in Mirau configuration.
Figure 3:
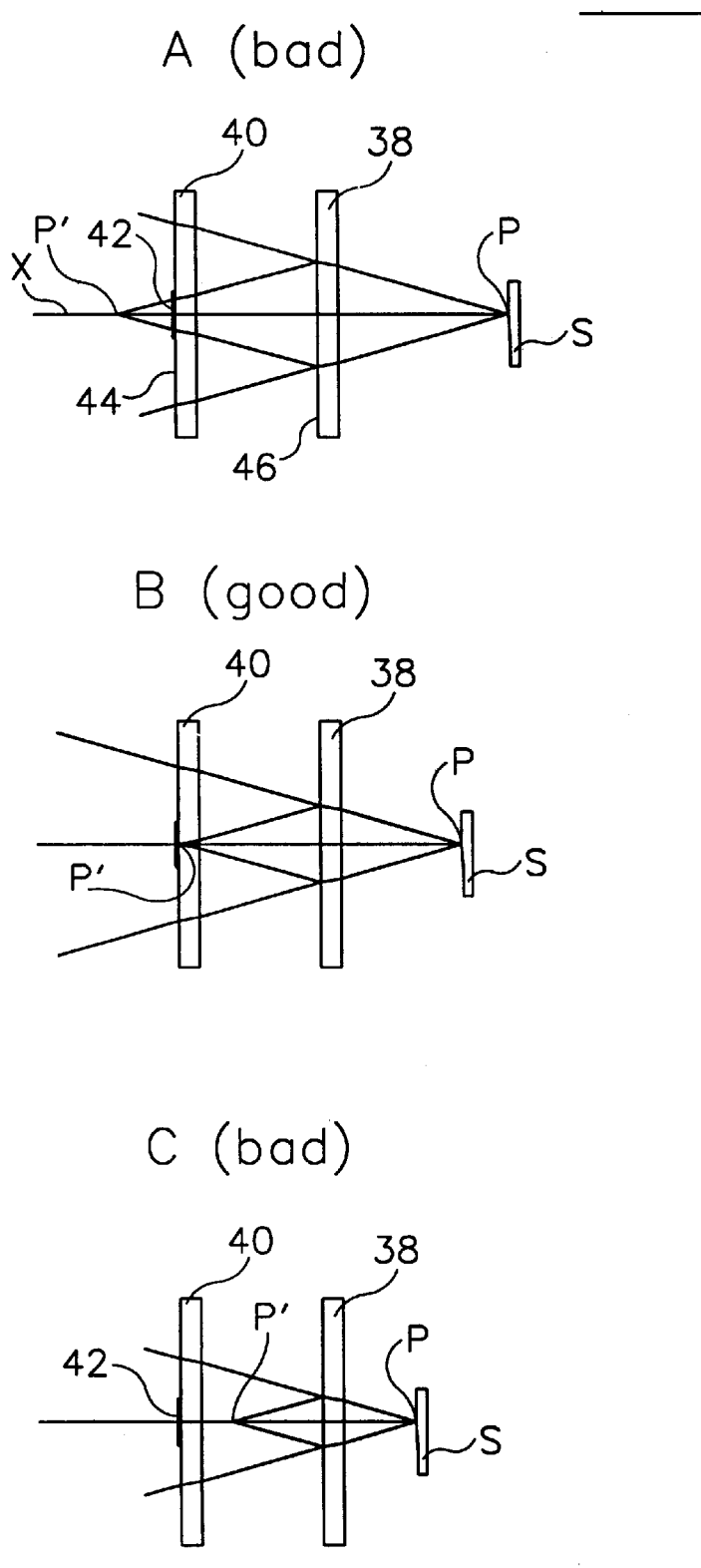
FIG. 3 illustrates the mismatch between the test and the reference focal lengths of a conventional interferometer caused by ambient temperature variations.
Figure 5:
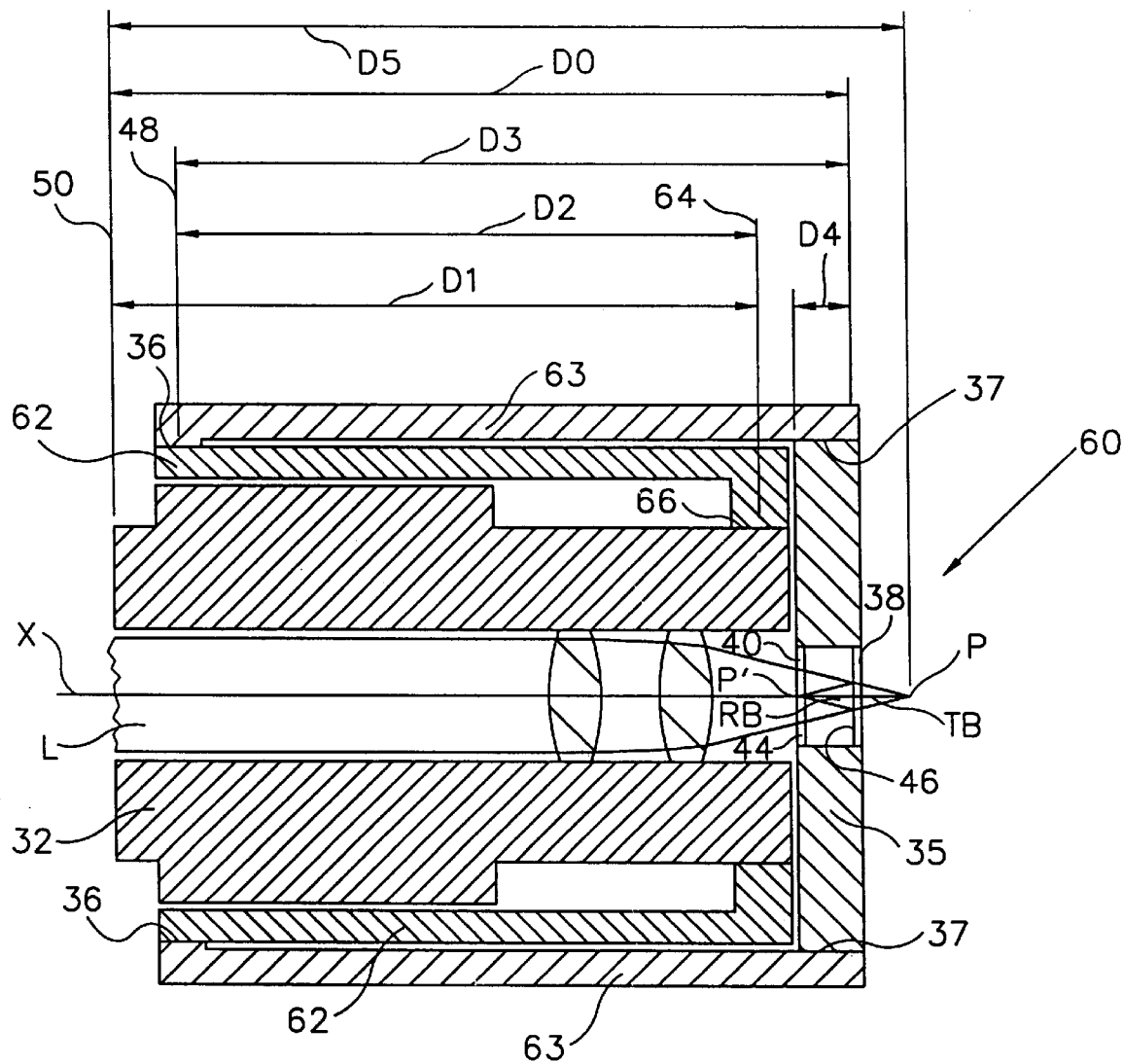
FIG. 5 is a schematic representation of a conventional interferometric microscope objective modified according to the invention.
Figure 6:
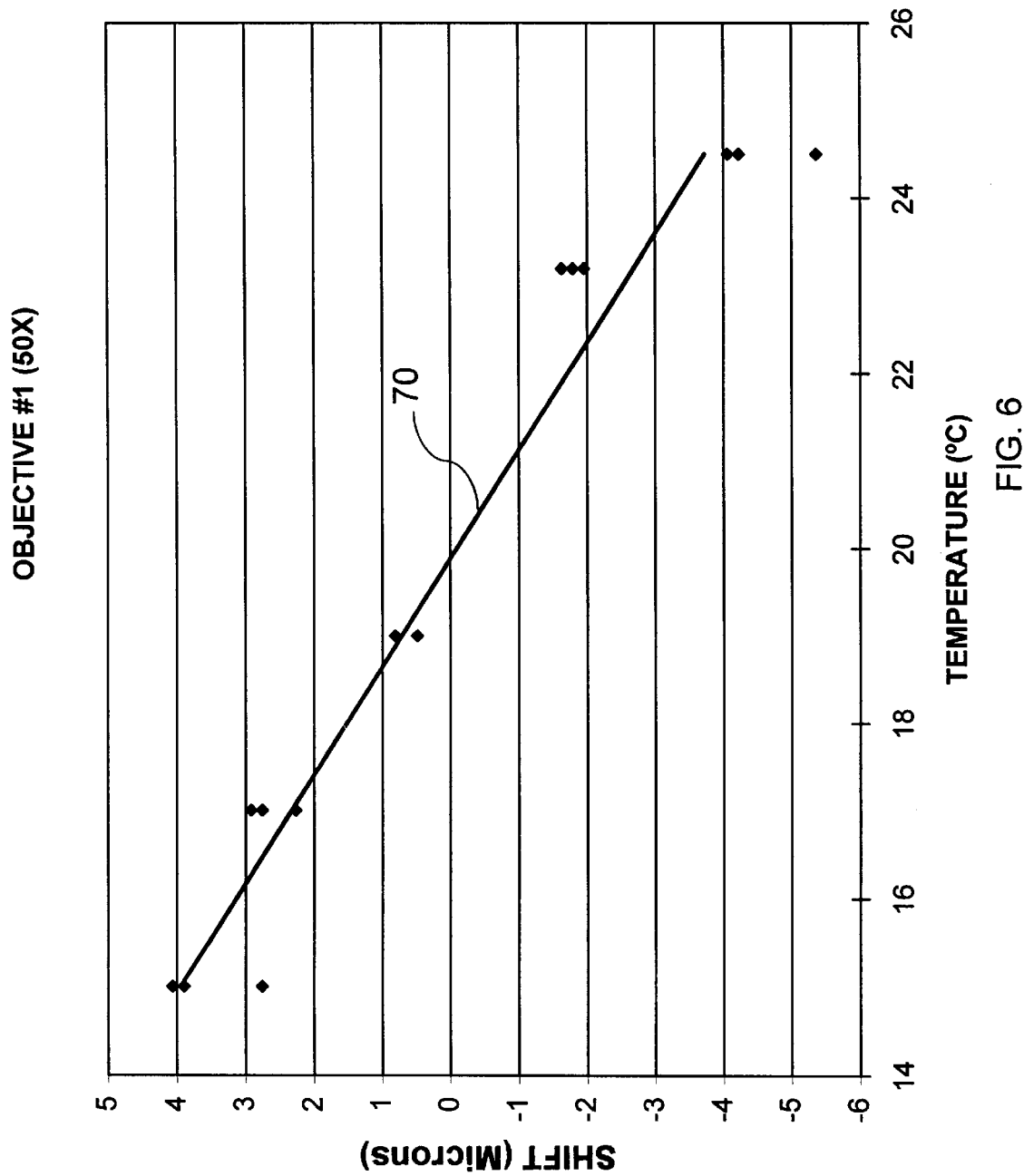
FIGS. 6–9 illustrate the typical, substantially linear relationship between the shift in the position of the reference focal point with respect to the reference mirror with temperature changes in four commercial interferometric objectives.
Figure 7:
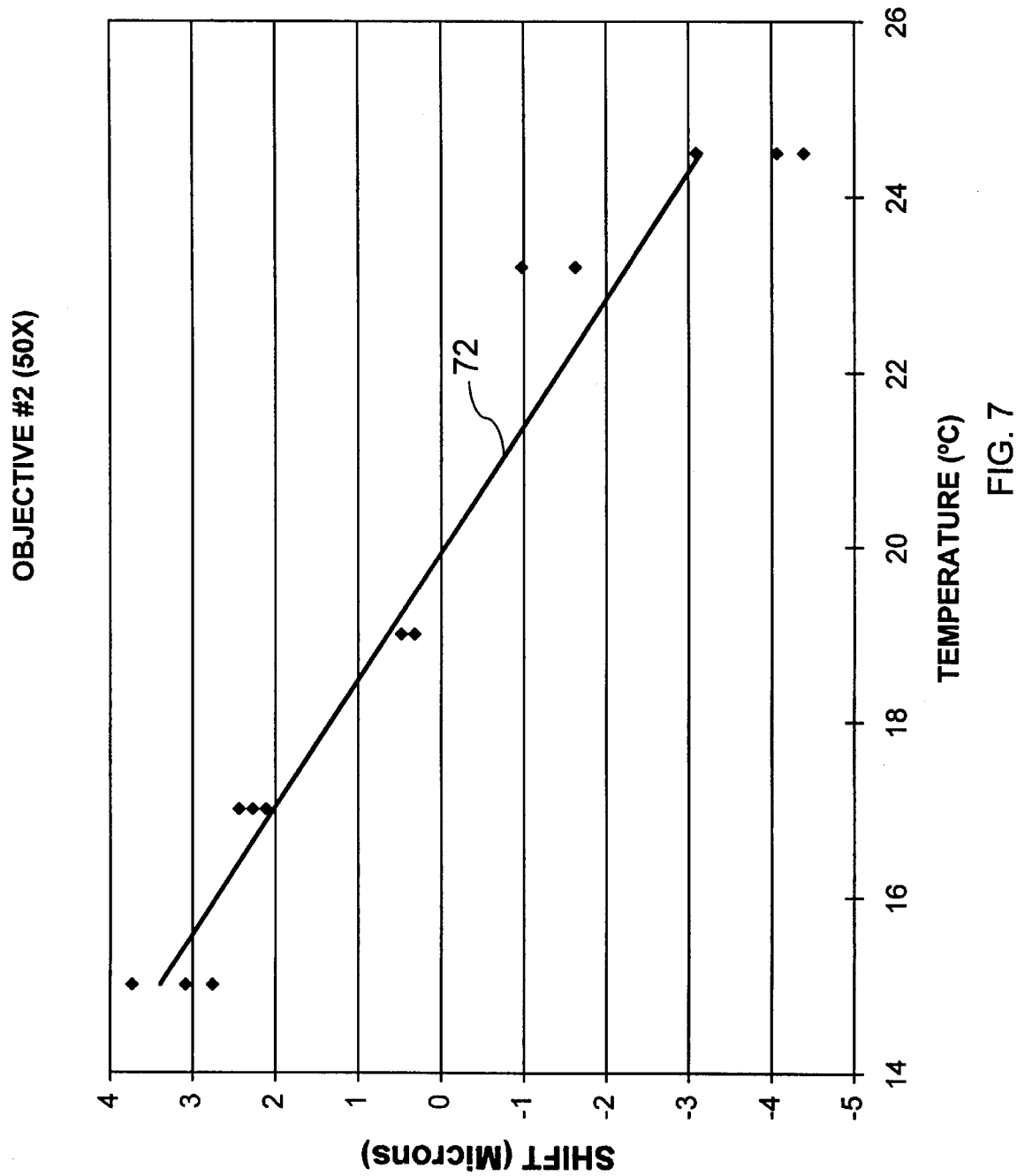
Figure 8:
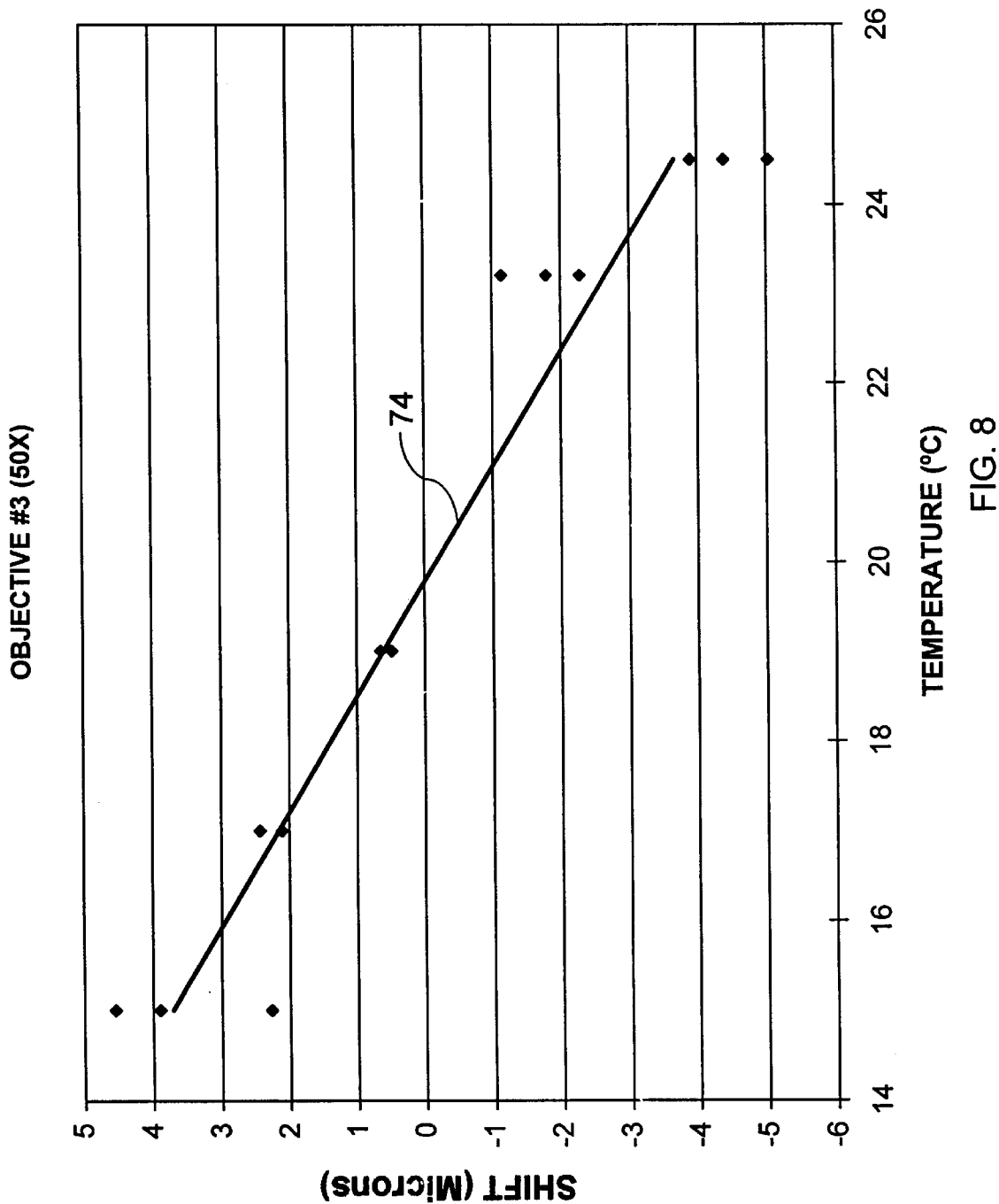
Figure 9:
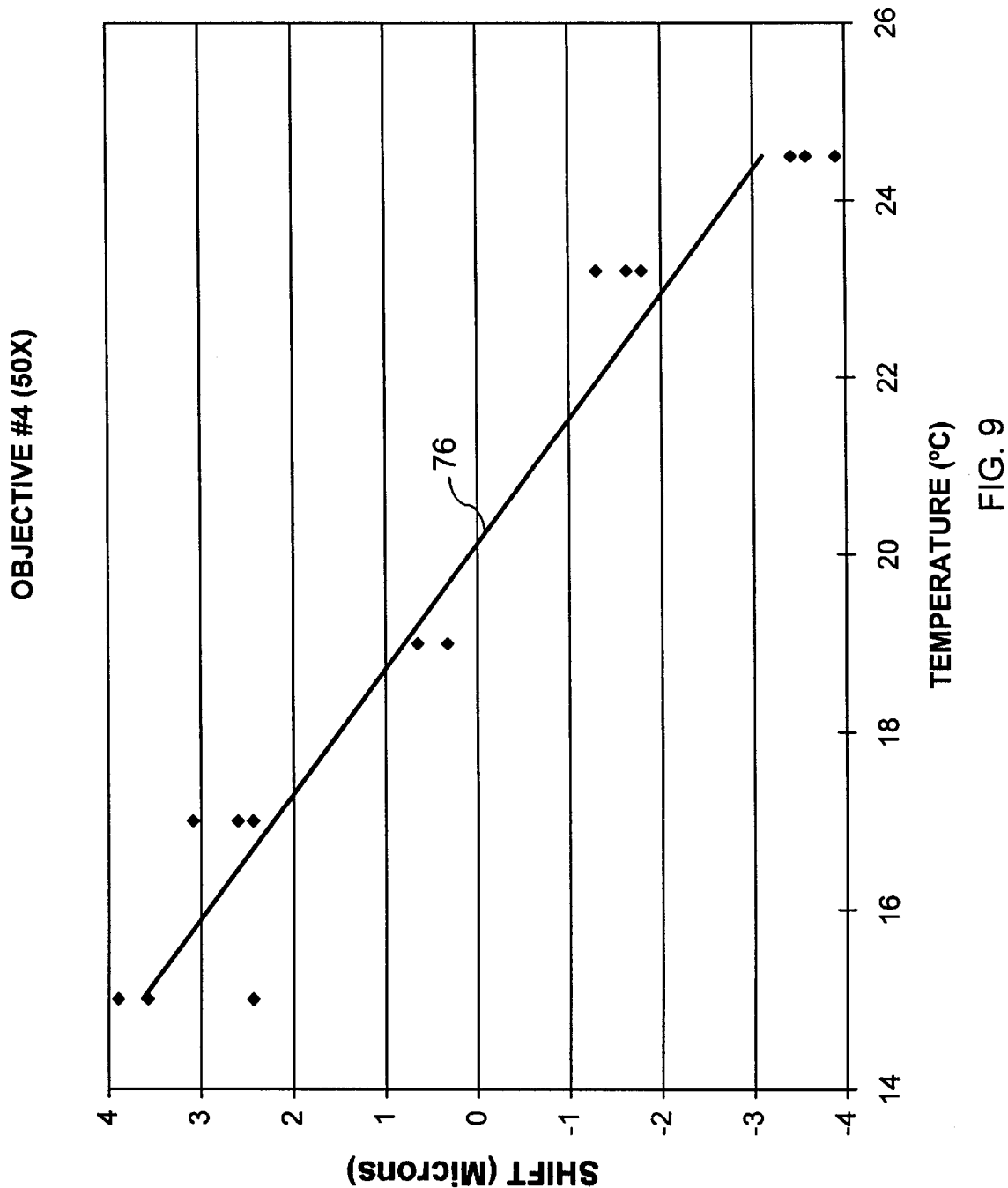

This understanding of the structure and physical characteristics of the various components in an interferometric objective make it possible to judicially select appropriate materials and components to offset thermal effects. Referring to FIG. 5, the structure of an interferometric objective 60 modified according to the invention is illustrated. The collar portion 35 (FIGS. 2 and 4) housing the splitter 38 and reference flat 40 in the original focusing sleeve 34 is separated from the cylindrical portion of the sleeve and coupled to the support sleeve 32 by two new, substantially cylindrical components 62 and 63. These components are coupled sequentially to increase the length of the material responsive to thermal effects and provide an opportunity to control the assembly's behavior by selecting materials with the appropriate thermal characteristics. Thus, a first component 62 is attached to and directed backward from the forward portion of the support sleeve 32; then, a second component 63 is attached to and directed forward from the backward portion of component 62, and is finally coupled to the original collar portion 35. Thus, a thermal effect will result substantially in the linear combination of the effect on each individual segment of the assembly.

In this new configuration, the distances traveled by the reference beam RB and the test beam TB are defined in terms of the new structural segments in the objective 60. As in the case of FIG. 4, longitudinal positions 48 and 64 are chosen to represent average points of rigid connection within respective attachment collars 36 and 66. The position 64 is intended to represent the position of an effective circumferential line of attachment between the support sleeve 32 and the first component 62; and the position 48 represents the position of an effective circumferential line of attachment between the first component 62 and the second component 63. The second component 63 is then connected to the collar portion 35 so as to form an integral member (such as by a solid connection along the annular surface 37). As in the case illustrated in FIG. 4, in fact the various members constituting the structure of the objective 60 are coupled through surface attachment (one of which is threaded for focusing purposes), but the line-contact approximations are necessary to provide longitudinal positions corresponding to effective points of attachment between the various components.

Based on the configuration of FIG. 5, after entering the objective 60, the reference beam RB (coextensive with the beam L at the point of entry) travels a distance D0 forward from the entry point 50 to the splitter's surface 46, and then a distance D4 backward to the reference focal point P'. Similarly, the test beam TB travels a distance D5 from the entry point 50 to the focal point P. Analyzing the thermal effects on the structure of the objective 60, the distance D0 varies as a result of the composite lengthening or shortening of the support sleeve 32, the first component 62, the second component 63, and the collar portion 35. So long as the contact surfaces in the attachment collars 36 and 66 are relatively small in comparison to the lengths of the various members (so that the effective-point-of-attachment approximation discussed above is valid), the distance D0 can be expressed in terms of the distance D1 from the entry point 50 to the point of attachment 66 between the support sleeve 32 and the first component 62, the distance D2 to the point of attachment 48 of the first component 62 to the second component 63, and the distance D3 to the splitter's surface 46, as follows $$D0(T)=D1(T)-D2(T)+D3(T). \qquad (4)$$

Since the goal of the invention remains to manipulate the thermal characteristics of the objective's components so that the reference and test lengths remain substantially equal in spite of temperature fluctuations, the following new identity becomes the desirable goal of the invention $$D1(T)-D2(T)+D3(T)+D4(T)=D5(T), \qquad (5)$$

where T is the temperature of the objective.

That is, the length and material of the components 62 and 63 can be selected so that the shift caused by a temperature differential $\Delta T$ between the reference and test lengths is substantially zero within the temperature range of operation. Since the total path length variation $\Delta D$ with temperature is the result of the cumulative effect of the length change in each structural segment, the change along the reference beam caused by a temperature differential $\Delta T$ is given by $$\Delta D=\Delta D1-\Delta D2+\Delta D3+\Delta D4 \qquad (6)$$

Assuming that the support sleeve 32 and the collar portion 35 are made of the same material 1 with a coefficient of thermal expansion $k_1$ and that the components 62 and 63 are made of materials 2 and 3 with coefficient of thermal expansion $k_2$ and $k_3$, respectively, Equation 6 can be expressed in terms of the length and thermal-expansion coefficient of each segment, as follows $$\Delta D=k_1 D1(\Delta T)-k_2 D2(\Delta T)+k_3 D3(\Delta T)+k_1 D4\,(\Delta T). \qquad (7)$$

Furthermore, based on the experimental observation that over the temperature of interest the length of the test beam D5 varies approximately linearly with temperature, the following can be written:

$$\Delta D5=KD5(\Delta T) \qquad (8)$$

where K is an approximate linear expansion coefficient including both mechanical and optical temperature effects on the length of the test beam.

Setting Equation 7 equal to $\Delta D5$ yields the relation necessary to produce zero relative shift between the reference and test lengths as a function of temperature, thereby producing the approximate a thermal behavior that is desired for the interferometric objective of the invention. This relation can be written as:

$$KD5 = k_1(D1+D4) - k_2 D2 + k_3 D3. \tag{9}$$

Based on Equation 9, it is possible to judiciously select materials for components 62 and 63 that will approximate the desired zero-shift behavior. Once $k_2$ and $k_3$ are selected, lengths for D2 and D3 can also be selected to fit the equation, and then optimized by empirical testing to account for the analytical approximations of the procedure. We found that this theoretical approach, further refined with empirical data, produces great improvements in the performance of conventional interferometric objectives.

For example, a Nikon objective model CF Plan 50x/0.55 DI, Part No. 405001, originally constructed with a support sleeve 32 (about 3.6 cm long) and a focusing sleeve 34 made of brass, was modified according to the invention by providing intermediate components 62 and 63 substantially as shown in FIG. 5. Invar 36 (an iron alloy with 36% nickel and small quantities of manganese, silicon, and carbon) was selected for component 62. Invar 36 is used in optical instruments because of its very low coefficient of thermal expansion (~1.26 ppm/° C.) over the limited temperature range of interest for most commercial applications (typically between 4 and 38° C.). An aluminum alloy (alloy 6061, made with 0.6 silicon, 0.25 copper, 1.0 magnesium, and 0.2 chromium, having a coefficient of thermal expansion of ~23.6 ppm/° C.) was selected for component 63. The combination showed excellent thermal behavior for the purposes of the invention, where D2 and D3 were approximately 3.6 cm and 3.8 cm long, respectively.

FIGS. 6–9 illustrate the typical, substantially linear relationship between the shift in the position of the reference focal point P' with respect to the reference mirror 42 with temperature changes in four commercial interferometric objectives. Note that each figure represents data from three sets of measurements fitted with a straight line for a given objective. Each line 70,72,74,76 represents the particular thermal characteristics of its corresponding objective.

Based on the discovery illustrated in FIGS. 6–9, the corrective approach disclosed above was followed with the object of designing intermediate components 62 and 63 that would reduce the slope of the lines 72–76 to zero. In order to provide flexibility of design for the components 62 and 63 of the invention, we found that the materials selected should preferably combine a relatively low with a relatively high coefficient of thermal expansion. By incorporating the Invar 36 and aluminum components described above in the tested Nikon objectives in a structural configuration of the type shown in FIG. 5, we were able to change the objective's thermal characteristics and produce a substantially a thermal response. In fact, the thermal response of the modified objectives was so small that it was not possible to directly measure the shift in the position of the reference focal point P' with respect to the reference mirror 42 as a function of temperature changes because it was found to be within the measurement error.

Figure 10:
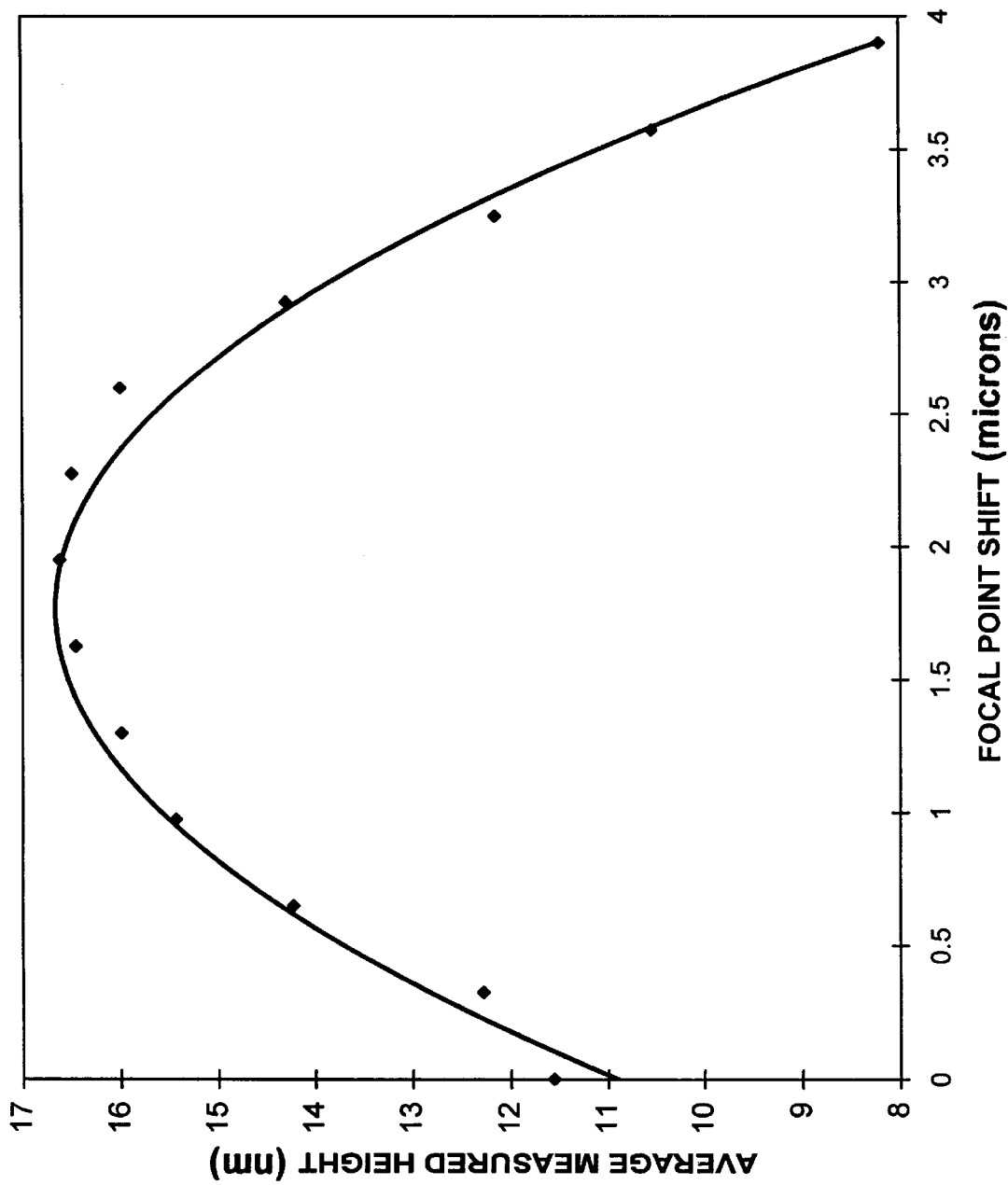
FIG. 10 is a plot of average measured height of a fixed structure versus focal point shift to illustrate the parabolic nature of the correlation.

In order to overcome this difficulty, we exploited a correlation, which is well known in the art, between measured heights and focal point shifts resulting from temperature variations. It is known that height measurements of a specific structure on a test surface decrease for temperatures both below and above the nominal temperature of the instrument (that is, the temperature at which the reference mirror 42 is in focus by design or calibration), producing parabolic plots of height versus focal-point-shift of the type shown in FIG. 10 (wherein the data are curve fitted to illustrate their parabolic nature). A corresponding parabolic plot is also produced by height-versus-temperature measurements. Therefore, the effectiveness of the invention was confirmed by plotting the measured average height of a fixed structure in a sample surface as the position of the focal point with respect to the reference mirror (or viceversa) was changed by induced temperature variations. In practice, a flattening of the height-versus-temperature curve produced by the structural modifications of the invention is a measure of a corresponding flattening of the shift-versus-temperature curve of FIGS. 6–9, which is the goal of the invention.

Figure 11:
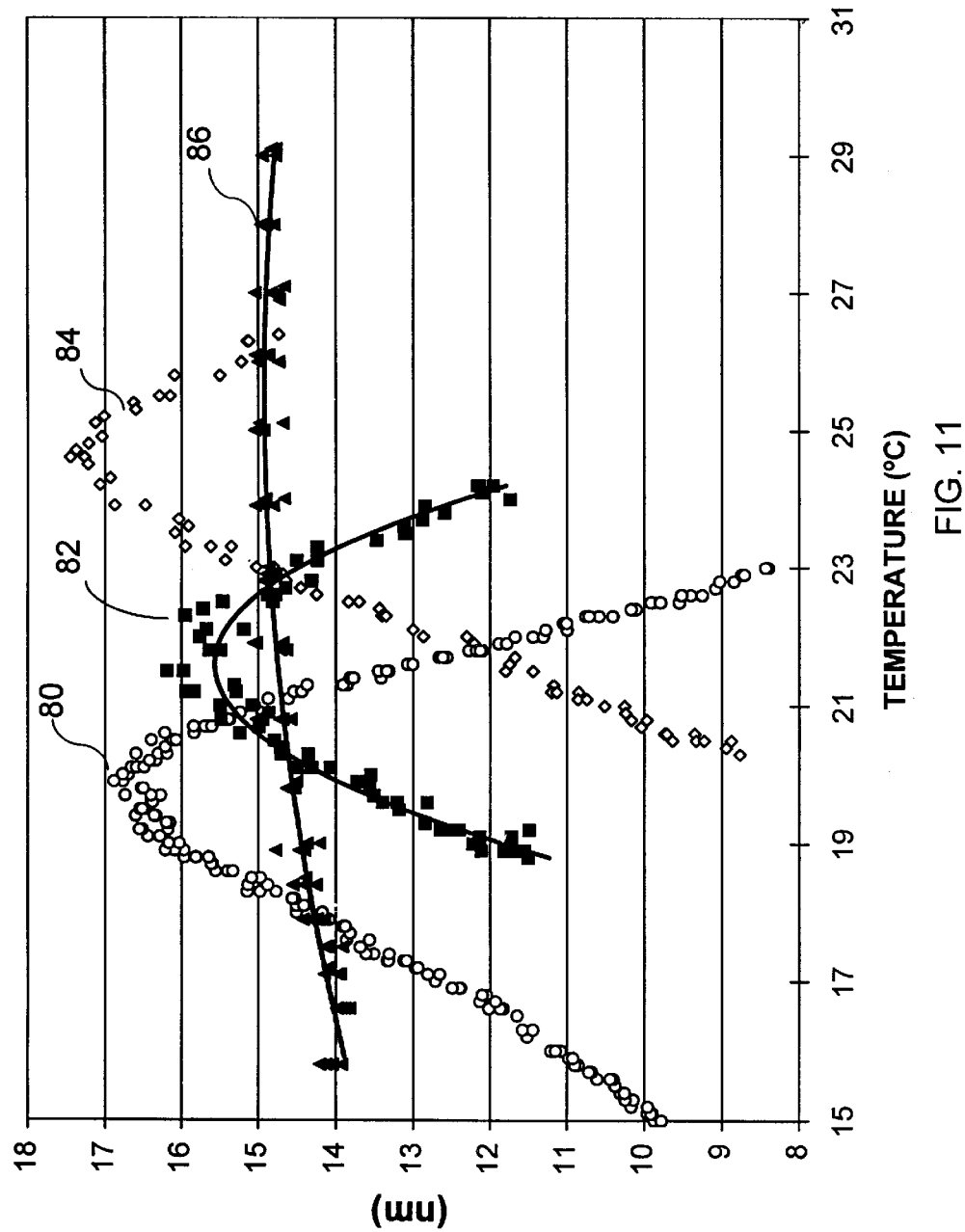
FIG. 11 shows four plots of average height measurements of fixed structures as a function of temperature variations for the same objectives of FIGS. 6–9 with one objective modified according to the invention.

Accordingly, the invention was tested by plotting average height measurements of a fixed structure as a function of temperature within the range of interest. The structure used consisted of laser texture bumps in a computer drive disk. FIG. 11 shows such plots for the same objectives of FIGS. 6–9 with one objective (#4) modified according to the invention. The parabolic data 80, 82 and 84 correspond to unmodified objectives with nominal temperatures of about 20, 22 and 25° C., while the substantially linear data 86 correspond to the objective modified according to the invention. Note that data 82 and 86 were fitted by least squares techniques to illustrate the parabolic and substantially linear nature of these data. It is clear from the figure that the addition of components 62 and 63 produced a substantially a thermal objective for which no nominal temperature is identifiable.

Figure 12:
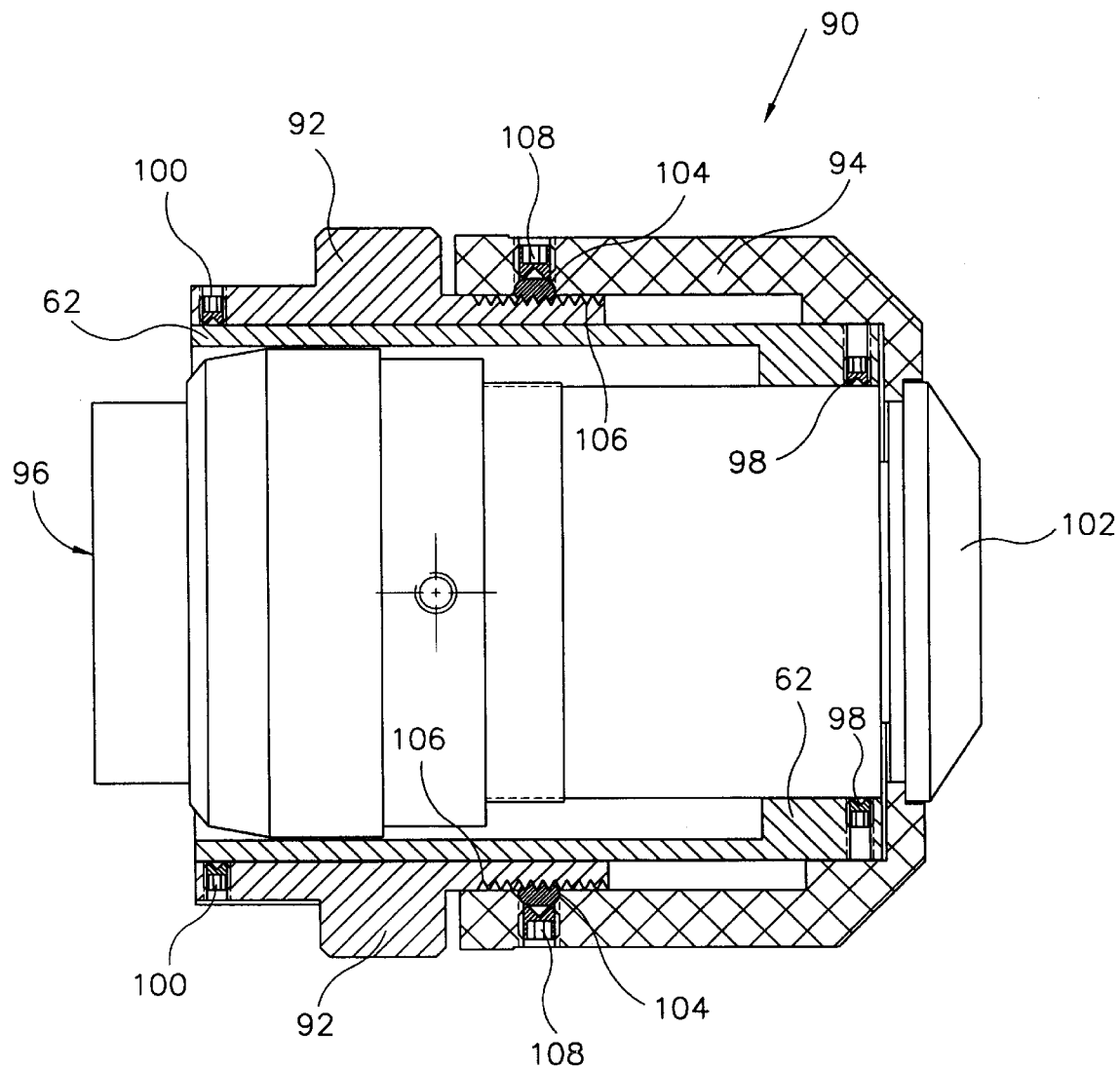
FIG. 12 is a schematic representation of a conventional interferometric microscope objective modified according to an alternative embodiment of the invention.

It is understood that the concept of the invention is applicable to minimize thermal effects in optical devices with different structural configurations from the objective of FIG. 4. Components may be added with different lengths and shapes as determined necessary to neutralize focal-point thermal shifts within the temperature range of interest. FIG. 12 is an assembly drawing of another embodiment 90 of the invention where the second component 63 is divided into a fixed portion 92 and a rotatably-movable focusing portion 94. A commercial interferometric objective 96, such as the Nikon objective described above, is mounted to the components constituting the invention. One end of a cylindrical first component 62 made of Invar alloy is fixedly connected to the support sleeve of the objective (not seen in the drawing) by means of radial set screws 98. The fixed portion 92, made of aluminum alloy, is fixedly connected to the other end of the first component 62 by means of similar set screws 100 (note that no other fixed contact exists between the two structures, so that they are free to move with respect to one another as a result of thermal effects). Finally, the focusing portion 94 is fixedly connected to the collar 102 containing the interferometric optics in the objective 96 and is screwably connected to the fixed portion 92. The screwable connection is provided by means of radially-distributed threaded inserts 104 meshed with conforming threads 106 (shown enlarged for convenience) in the outer surface of the fixed portion 92, so that the focusing portion 94 can be rotated and shifted axially to focus the test beam on a sample surface (not shown). Set screws 108 are also used to cause and adjust the engagement of the inserts 104 with the threads 106.

The invention has been described for convenience illustrating an interferometric objective in horizontal position. In practice, these objectives are usually mounted in vertical position and translated to perform vertical scanning downward from an initial reference position. Similarly, the invention has been described in terms of the effective addition of two new components having a length approximately equal to that of the objective, but different lengths and more or less components could obviously be used if necessary to achieve the goals of the invention. For example, the first and second components 62,63 in FIG. 5 could be extended beyond the length of the objective to provide additional overall thermal expansion. Equivalently, multiple layers of Invar and aluminum components could be connected sequentially and stacked to produce the same effect. Finally, materials with different thermal-expansion characteristics could be used to match the requirements of the particular application.

It is also understood that the concept of the invention is applicable in equivalent fashion not only to interferometric microscope objectives but to any optical device exhibiting a substantially linear focal point misalignment in response to thermal effects and where a second surface must be held in focus throughout some temperature range of interest. In devices exhibiting a nonlinear, but known, thermal response, the invention could still be practiced by assuming a linear behavior over a limited range around the nominal temperature of the instrument. For example, the device's thermal response could be approximated by a linear model over the range of interest and the model could then be used as described to minimize thermal shifts.

Therefore, various changes in the details, steps and components that have been described may be made by those skilled in the art within the principles and scope of the invention herein illustrated and defined in the appended claims. While the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. In an optical device including a reference surface fixed in a first support structure and lens means housed in a second support structure for focusing a beam of light onto said surface along an optical axis, said first and second support structures being mechanically connected by rigid coupling means having a length responsive to thermal effects, and the optical device having an optimal operating condition at a predetermined nominal temperature wherein a focal point position of said lens means coincides with a location of said reference surface along said optical axis, a method for maintaining substantial coincidence of said focal point position with said location of the reference surface with temperature variations, the method comprising the following steps:

establishing a first functional relationship between a range of temperature variations and shifts produced thereby in said focal point position with respect to an entry point in the optical device;

establishing a second functional relationship between said range of temperature variations and shifts produced thereby in said location of the reference surface with respect to the entry point in the optical device;

altering said length responsive to thermal effects by introducing at least one additional component in the rigid coupling means connecting the first and second support structures; and selecting a length and a coefficient of thermal expansion of said at least one additional component adapted to maintain a substantial identity between said first and second functional relationships such that said shifts in the focal point position and in the location of the reference surface with respect to the entry point in the optical device are approximately equal, thereby causing said optimal operating condition to be substantially maintained within the range of temperature variations.

2. The method of claim 1, wherein said optical device consists of an interferometric microscope objective, said first structure consists of a collar fixedly housing said surface, and said second structure consists of a sleeve fixedly housing said lens means.

3. The method of claim 2, wherein said first and second functional relationships are substantially linear.

4. The method of claim 2, wherein said at least one additional component comprises a first component coupled to said sleeve and a second component coupled to said collar.

5. The method of claim 4, wherein said first and second components are coupled to one another so as to produce an increase in said length responsive to thermal effects.

6. The method of claim 3, wherein said at least one additional component comprises a first component coupled to said sleeve and a second component coupled to said collar.

7. The method of claim 6, wherein said first and second components are coupled to one another so as to produce an increase in said length responsive to thermal effects.

8. The method of claim 5, wherein said first component comprises a portion made with an iron-nickel alloy and said second component comprises a portion made with an aluminum alloy.

9. The method of claim 7, wherein said first component comprises a portion made with an iron-nickel alloy and said second component comprises a portion made with an aluminum alloy.

10. In an optical device including a reference surface fixed in a first support structure and lens means housed in a second support structure for focusing a beam of light onto said surface along an optical axis, said first and second support structures being mechanically connected by rigid coupling means having a length responsive to thermal effects, and the optical device having an optimal operating condition at a predetermined nominal temperature wherein a focal point position of said lens means coincides with a location of said reference surface along said optical axis, apparatus for maintaining substantial coincidence of said focal point position with said location of the reference surface with temperature variations, the apparatus comprising:

at least one additional component incorporated in the rigid coupling means connecting the first and second support structures;

wherein said at least one additional component is selected according to the following procedure:

establishing a first functional relationship between a range of temperature variations and shifts produced thereby in said focal point position with respect to an entry point in the optical device;

establishing a second functional relationship between said range of temperature variations and shifts produced thereby in said location of the reference surface with respect to the entry point in the optical device; and establishing a length and a coefficient of thermal expansion for said at least one additional component adapted to maintain a substantial identity between said first and second functional relationships such that said shifts in the focal point position and in the location of the reference surface with respect to the entry point in the optical device are approximately equal, thereby causing said optimal operating condition to be substantially maintained within the range of temperature variations.

11. The apparatus of claim 10, wherein said optical device consists of an interferometric microscope objective, said first structure consists of a collar fixedly housing said surface, and said second structure consists of a sleeve fixedly housing said lens means.

12. The apparatus of claim 11, wherein said first and second relationships are substantially linear.

13. The apparatus of claim 11, wherein said at least one additional component comprises a first component coupled to said sleeve and a second component coupled to said collar.

14. The apparatus of claim 13, wherein said first and second components are coupled to one another so as to produce an increase in said length responsive to thermal effects.

15. The apparatus of claim 12, wherein said at least one additional component comprises a first component coupled to said sleeve and a second component coupled to said collar.

16. The apparatus of claim 15, wherein said first and second components are coupled to one another so as to produce an increase in said length responsive to thermal effects.

17. The apparatus of claim 14, wherein said first component comprises a portion made with an iron-nickel alloy and said second component comprises a portion made with an aluminum alloy.

18. The apparatus of claim 16, wherein said first component comprises a portion made with an iron-nickel alloy and said second component comprises a portion made with an aluminum alloy.

19. The apparatus of claim 10, wherein said first functional relationship is based on length and coefficient-of-thermal-expansion parameters for the optical device and said second functional relationship is based on length and coefficient-of-thermal-expansion parameters for said coupling means.

20. The apparatus of claim 13, wherein a length and a coefficient of thermal expansion for each of said first and second components are selected using the following identity between said first and second functional relationships:

$$KD5 = k_1(D1+D4) - k_2 D2 + k_3 D3,$$

wherein D1 is an effective optical length along the optical axis for said sleeve from said entry point; D2 and D3 are effective optical lengths along the optical axis for the first component coupled to the sleeve and the second component coupled to the collar, respectively; D4 is an effective optical length along the optical axis for the collar; D5 is an optical distance of the focal point from the entry point; $k_1$ is a coefficient of thermal expansion for the sleeve and the collar; $k_2$ and $k_3$ are coefficients of thermal expansion for the first component coupled to the sleeve and the second component coupled to the collar, respectively; and K is an approximate linear expansion coefficient including both mechanical and optical temperature effects for the optical device.

21. The method of claim 1, wherein said first functional relationship is based on length and coefficient-of-thermal-expansion parameters for the optical device and said second functional relationship is based on length and coefficient-of-thermal-expansion parameters for said coupling means.

22. The method of claim 4, wherein a length and a coefficient of thermal expansion for each of said first and second components are selected using the following identity between said first and second functional relationships:

$$KD5 = k_1(D1+D4) - k_2 D2 + k_3 D3$$

wherein D1 is an effective optical length along the optical axis for said sleeve from said entry point; D2 and D3 are effective optical lengths along the optical axis for the first component coupled to the sleeve and the second component coupled to the collar, respectively; D4 is an effective optical length along the optical axis for the collar; D5 is an optical distance of the focal point from the entry point; $k_1$ is a coefficient of thermal expansion for the sleeve and the collar; $k_2$ and $k_3$ are coefficients of thermal expansion for the first component coupled to the sleeve and the second component coupled to the collar, respectively; and K is an approximate linear expansion coefficient including both mechanical and optical temperature effects for the optical device.

* * * * *